United States Patent [19]

Smilgys

[11] 4,180,202

[45] Dec. 25, 1979

[54] PRESETTABLE COUNTER MECHANISM

[75] Inventor: Bruno S. Smilgys, Hartford, Conn.

[73] Assignee: Veeder Industries, Inc., Hartford, Conn.

[21] Appl. No.: 734,601

[22] Filed: Oct. 21, 1976

Related U.S. Application Data

[63] Continuation-in-part of Ser. No. 576,241, May 12, 1975, Pat. No. 3,988,576.

[51] Int. Cl.² .......................................... G06C 15/42
[52] U.S. Cl. ............................. 235/132 R; 235/94 R
[58] Field of Search ............ 235/132 R, 94 R, 139 R; 222/14, 15, 16, 20, 30

[56] References Cited

U.S. PATENT DOCUMENTS

| 3,057,553 | 10/1962 | Billeter | 235/132 R |
|---|---|---|---|
| 3,089,616 | 5/1963 | Wilson | 222/16 |
| 3,706,398 | 12/1972 | Kato et al. | 222/20 |
| 3,724,808 | 4/1973 | Sugden, Jr. | 222/20 |

Primary Examiner—Stephen J. Tomsky
Attorney, Agent, or Firm—Prutzman, Kalb, Chilton & Alix

[57] ABSTRACT

A counter operated control device is provided for controlling and terminating the delivery of liquid petroleum products and the like. The device includes a presettable counter controlling a multiple stage trip mechanism having independent first and second stage trip units. The counter is further provided with an interlock between a preset control rod and a valve control ring, an emergency trip feature, the ability to provide an adjustable trip setting without disassembly of the counter, an improved count transfer array and improved performance and accuracy through optimization of the operating forces within the counter.

18 Claims, 10 Drawing Figures

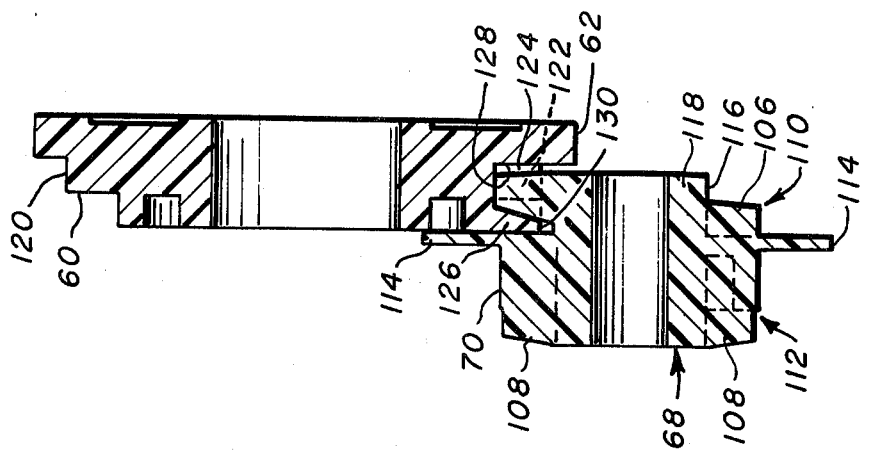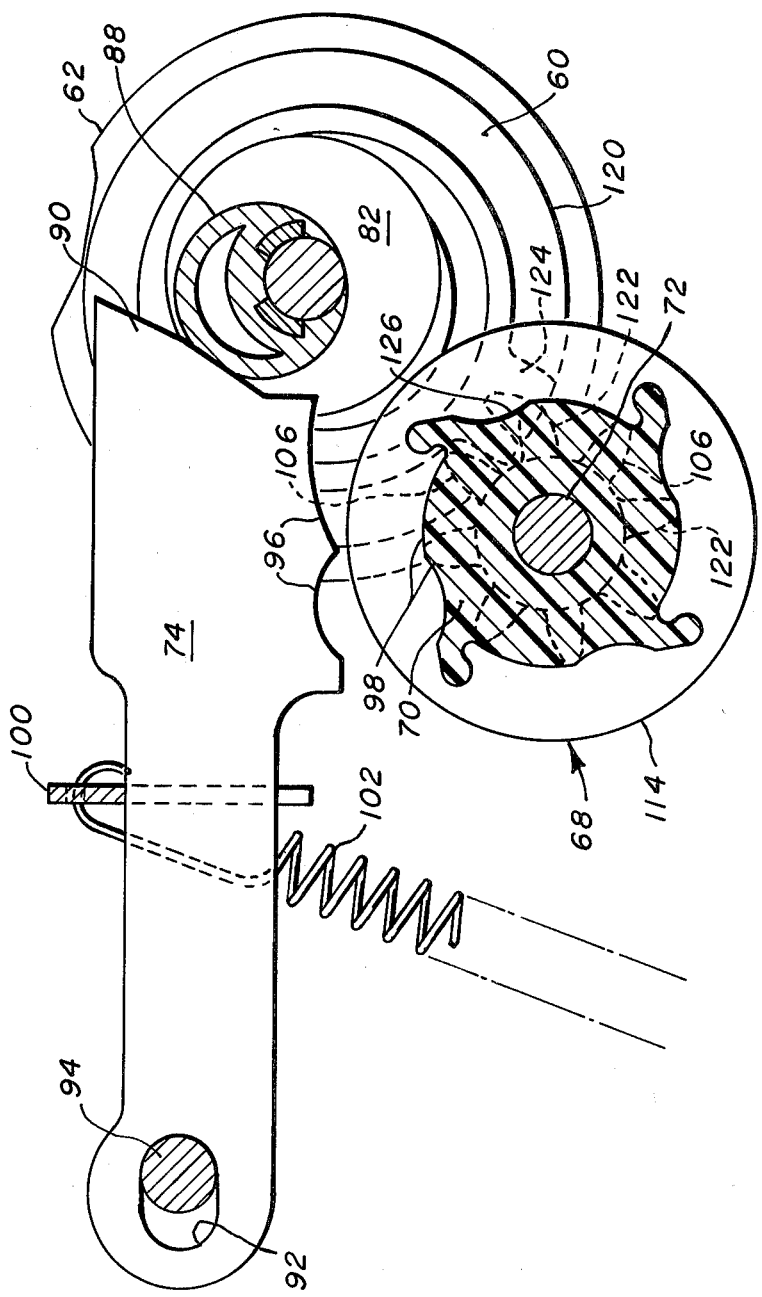

PRESETTABLE COUNTER MECHANISM

RELATED APPLICATION

This application is a continuation-in-part of my copending application Ser. No. 576,241 filed May 12, 1975 and entitled "Presettable Counter Mechanism", now U.S. Pat. No. 3,988,576.

BACKGROUND AND SUMMARY OF THE INVENTION

This invention relates generally to counter mechanisms and, more specifically, to counter operated control mechanisms. More specifically still, the invention relates to new and improved presettable counter mechanisms of modular design having notable utility in fluid fuel dispensing systems.

Presettable counters have been employed for controlling and terminating the delivery of liquid petroleum products. The presettable counter includes a plurality of number wheels which are connected by a count advance transfer mechanism, such that a higher order wheel automatically moves a single digit or count for each complete revolution of the adjacent lower order wheels. The transfer mechanism is disconnected during manual setting in a manner generally described in U.S. Pat. No. 3,456,877 entitled "Counting Mechanism" to permit individual setting or presetting of each digit wheel from a zero reference position in an additive direction. The counter is then driven in a reverse or substractive manner from the preset position and provides the necessary output when the counter reaches a predetermined referenced count, such as zero.

Typically, the output is provided by releasing a loaded and latched rotatably mounted control member when the predetermined reference is reached. Further, it is conventional to provide for an initial partial release of the control member at a predetermined reference greater than zero as for partially closing a flow control valve and to provide a final complete release of the control member at the zero reference to completely close the valve. Such two-stage closure of the valve is disclosed in the Billeter U.S. Pat. No. 3,057,553, the contents of which is incorporated herein by reference.

It is a principal object of the invention to provide a new and improved presettable counter mechanism of the modular or compartmental type having a new and improved arrangement for controlling the closure of a fuel control valve. Included in this object is the provision of a new and improved latching arrangement for releasably latching a fuel control valve in its fully and partially open positions.

It is a further object of the invention to provide a releasable latching arrangement which securely latches a control member in a loaded position yet requires a relatively small force to trip or release the latch. Further included in this object is the provision of a releasable latching arrangement which is reliable throughout an extended operating life. Still further in this object is the provision for an improved latching arrangement in a presettable counter for providing two-stage closure of a fuel control valve.

It is another object of the present invention to provide a new and improved presettable counter mechanism which provides for a two-stage latch releasing arrangement that ensures closure of a fuel valve at a zero reference regardless of the preset count. Included in this object is the provision of an improved arrangement capable of effecting an adjustable first-stage lock release at an easily adjusted first release count which is greater than the zero reference.

It is still another object of the present invention to provide new and improved means in a presettable counter for variably adjusting the count at which a two-stage releasable latch is released. Included in this object is the provision for an adjustable first-stage release and an independently adjustable second-stage release, which adjustments can be effected in a rapid and facile manner without disassembly of the presettable counter. The adjustable first-stage release includes the advantage of removable inserts in the trip cam associated with a higher order wheel for adjustment of the trip to any digit on the wheel while the second stage release is bidirectionally adjustable to provide greater flexibility of operation and more accurate stopping action at zero.

It is another object of the present invention to provide a new and improved manually presettable counter mechanism of the type described having an interlock arrangement for preventing change of the setting of the individual digit wheels while the control member is loaded preparatory to and during the substractive counting operation. Included in this object is the provision of a preset control interlock which also permits presetting the counter wheels only while the fuel valve controlled by the counter is in a closed position.

It is still a further object of the invention to provide a counter having a new and improved count transfer mechanism for transferring the counts between adjacent number wheels thereof. Included in this object is the provision for a new and improved transfer pinion and locking ring arrangement that assures proper orientation, alignment and inter-engagement therebetween when the counter wheels are conditioned for a counting operation.

Yet another object of the present invention is the provision for a presettable counter of the type described that includes a new and improved sliding pawl array associated with the transfer pinions for optimizing the operating forces acting thereon and assuring accurate reengagement of the pinion after a resetting operation.

A still further object of the present invention is the provision for an emergency stop trip mechanism that assure complete and full actuation of the two-stage closure for termination of fuel delivery irrespective of the position of the fuel control valve.

Other objects will be in part obvious and in part pointed out more in detail hereinafter.

A better understanding of the invention will be obtained from the following detailed description and the accompanying drawings of an illustrative application of the invention.

BRIEF DESCRIPTION OF THE DRAWINGS

In the drawings:

FIG. 4 is a sectional view taken along line 4—4 of FIG. 3 illustrating the count transfer mechanism of the number wheels of the presettable counter;

FIG. 5 is a sectional of the transfer mechanism of FIG. 4, showing its position at the time of count transfer;

DESCRIPTION OF THE PREFERRED EMBODIMENT

Figure 1:
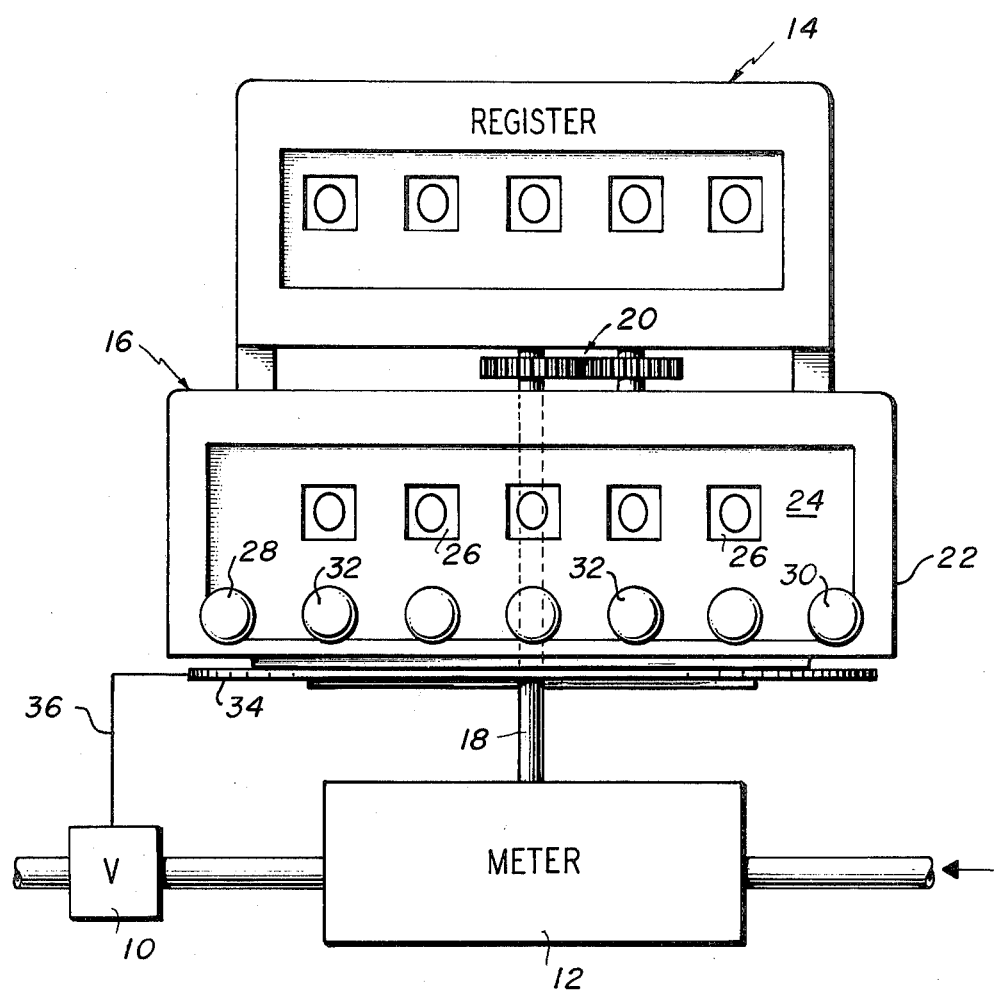
FIG. 1 is a diagrammatic front elevational view of a fuel dispensing system showing the presettable counter mechanism of the present invention connected therein.

Referring now in greater detail to the drawings wherein like reference numerals indicate like parts throughout the several figures, and particularly to FIG. 1 thereof, the present invention is diagrammatically shown applied to a fluid dispensing system for liquid petroleum products. The system typically includes a fluid flow control valve 10 for controlling the flow of a petroleum product or the like, a meter 12 for measuring the quantity of fluid dispensed through the valve 10, a register 14 providing a visual readout of the quantity of liquid passing through the meter 12 during a dispensing operation and a presettable subtracting counter 16 operatively interconnected to the valve 10 for controlling the operation thereof. The meter 12 is provided with a rotary output to both the presettable counter 16 and the register 14 via a suitable rotary drive such as a shaft 18 and gear assembly 20.

Figure 2:
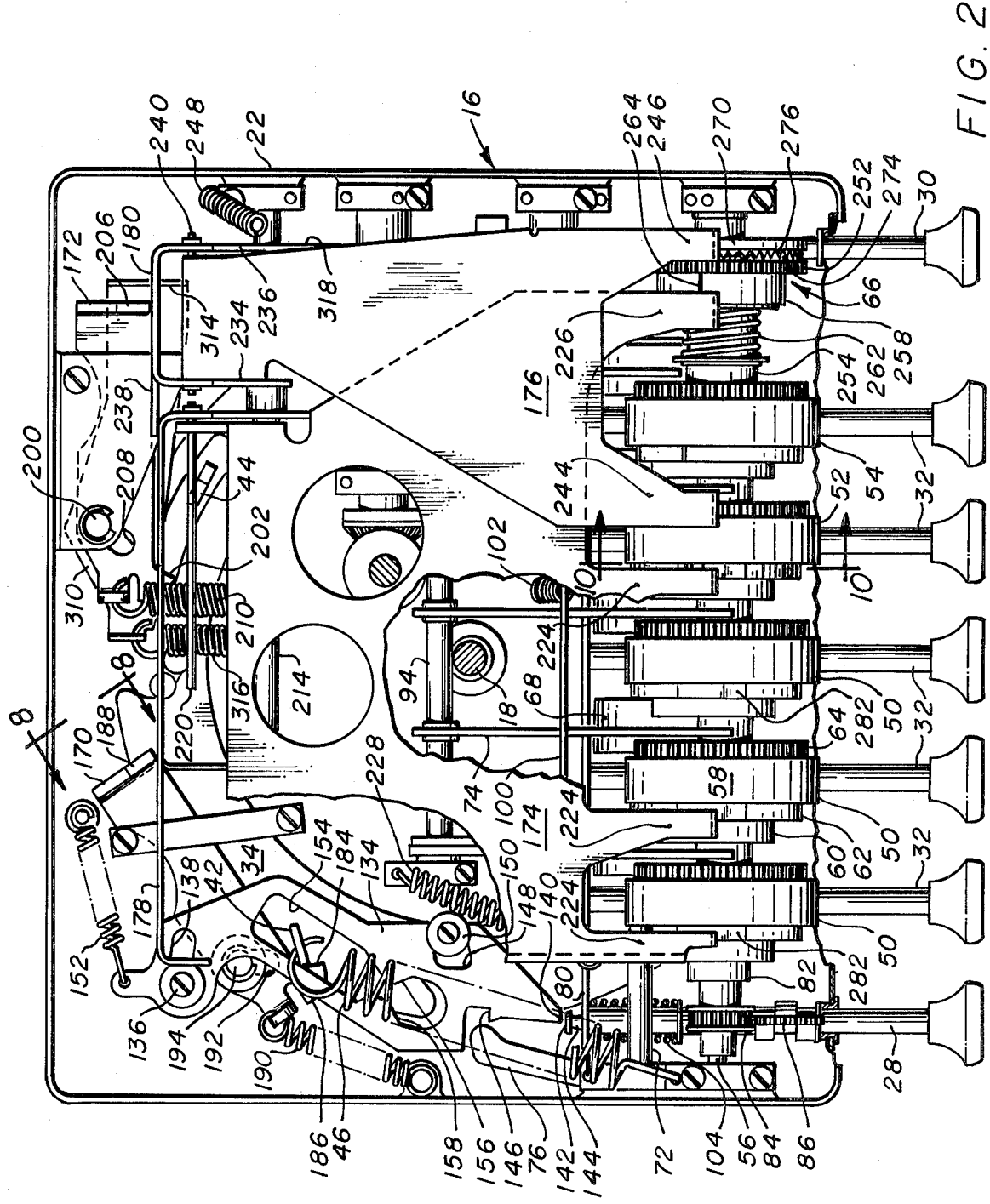
FIG. 2 is an enlarged top plan view, partially broken away and partially in section, of the presettable counter of FIG. 1 showing the internal construction including a fuel valve control member positioned for full open valve operation.

As shown in FIGS. 1 and 2, the presettable counter 16 includes a generally rectangular, box-like housing or frame 22, which may be cast or otherwise formed to house and support a counter mechanism therewithin. The frame 22 includes a front wall 24 having openings 26 therein for displaying the immediate setting or number count on the presettable counter. A series of manually operated button control rods extend through the front wall 24 below the display openings 26 for presetting the counter prior to delivery or effecting an emergency termination of the fluid delivery, when necessary. In the embodiment illustrated, these rods include a preset conditioning or control rod 28 adjacent one side of the frame, an emergency stop rod 30 adjacent the opposite side and a plurality of intermediate reset rods 32, each individually associated with a single count display wheel viewable within the display openings 26.

Figure 3:
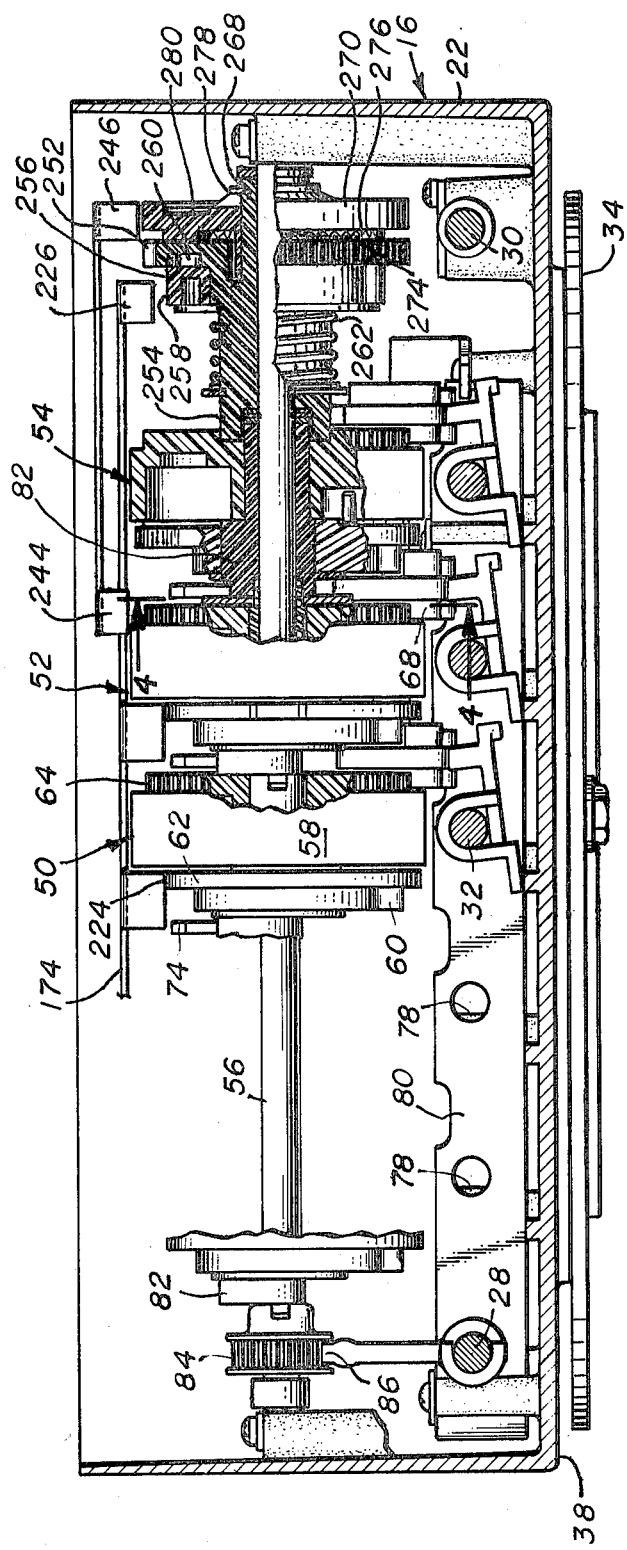
FIG. 3 is a front elevational view, partially broken away and partially in section, of the presettable counter of FIG. 2 depicting the construction of the number wheel assembly thereof.
Figure 6:
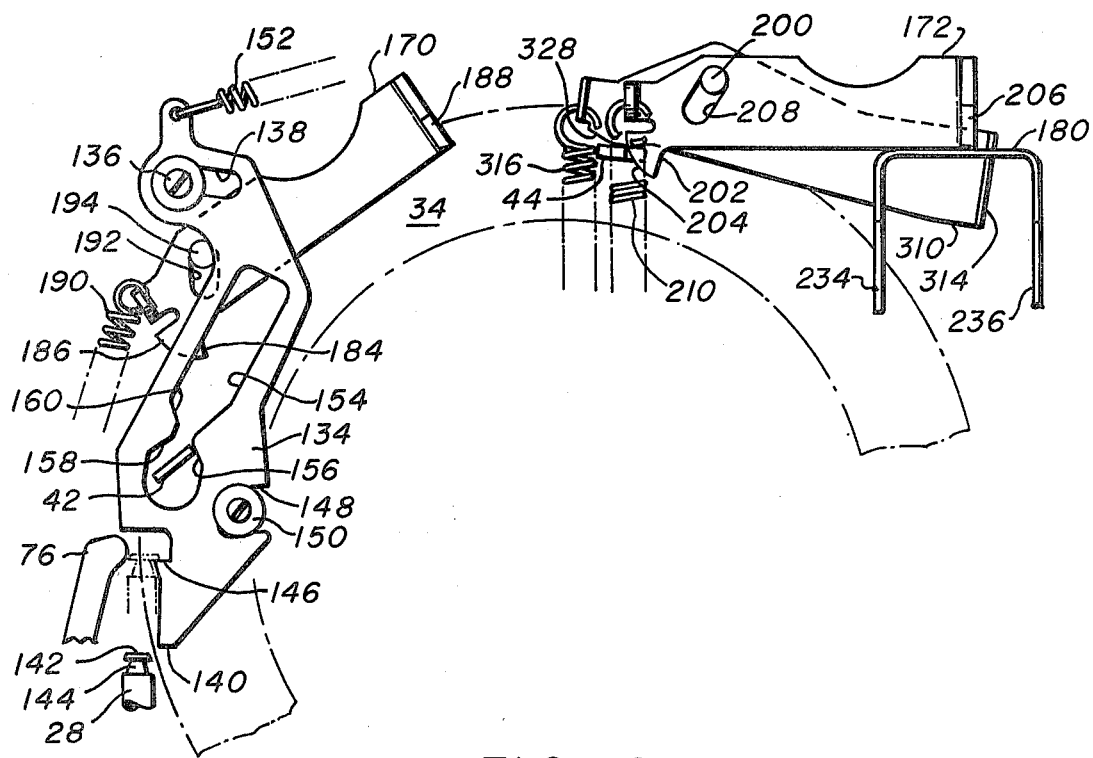
FIG. 6 is a partial plan view of the valve control member and two-stage latching mechanism with the valve control member in its "off" position.

The presettable counter includes a rotary valve control ring 34 of the general type shown in the aforementioned Billeter patent, which ring is connected through a suitable link 36 to the flow control valve 10 downstream of the meter 12. The ring 34 is mounted for rotation adjacent and beneath the base 38 of the housing 22 and, as shown in FIG. 3, is provided with an upstanding first stage trip flange 42 and circumferentially spaced second stage trip tab 44 operatively communicating with the presettable counter mechanism mounted within the housing 22. The ring 34 is biased in a counter-clockwise direction, as viewed in FIG. 2, by a drive spring 46 toward a closed valve "off" position, shown in FIG. 6, and is manually rotated in a clockwise direction, such as by a handle (not shown), against the bias of the spring 46 to partially or fully open valve positions shown, respectively, in FIGS. 7 and 2. A two-stage latching assembly is responsive to the operation of the presettable counter and operative to sequentially releasably latch the control ring 34 in first and second positions, corresponding with the full open and partially open positions, respectively, of the valve 10. The latching assembly is operative, as will be hereinafter described, to hold the valve 10 open during a predetermined first stage delivery, to release the first stage trip flange 42 of the control ring and quickly engage the second stage trip tab 44 to establish a partial flow setting of the valve during a predetermined second stage delivery and finally to release the tab 44 permitting the control ring 34 to fully close the valve 10.

The presettable counter 16 includes a plurality of digit display wheels 50, 52 and 54 rotatably mounted in coaxial alignment on a counter wheel shaft 56 supported by and extending horizontally between the sidewalls of the frame 22. The display wheels are constructed and arranged in substantially the same manner as set forth in my aforementioned copending application, Ser. No. 576,241, with each number wheel being comprised of an indicia wheel 58, a combined locking ring and transfer drive gear sector 60 of modified design, a release or trip conditioning release cam 62, and a transfer driven gear 64. A drive wheel assembly 66 is also coaxially mounted on the shaft 56 in spaced driving relationship to the lowest order number wheel 54 of the assembly. Mutilated transfer pinions 68, also of modified design and including a ratchet wheel portion 70, are rotatably mounted on a transfer pinion shaft 72 and are positioned between each pair of adjacent counter wheels, such as the tens wheel 52 and the adjacent higher order wheel 50, to provide for transferring a count between each adjacent higher order and lower order counter wheels. A series of no-back detent arms 74 are provided for engagement with the ratchet wheel portions 70 of each transfer pinion 68 and are pivoted into engagement therewith during the presetting operation and out of engagement therewith during the counting operation.

As fully described in my copending application Ser. No. 576,241, the frame 22 includes a cam member 76 inwardly of the preset control rod 28 and a plurality of rod stops 78 in alignment with the innermost ends of the reset rods 32. A sliding bar 80, apertured to receive the inner ends of the rods 32 and control rod 28, is positioned inwardly of and extends parallel to the counter wheel shaft 56 and is movable laterally by the preset control rod 28 as it moves inwardly against and is shifted laterally by the stationary cam member 76. The lateral movement of the bar 80 displaces the innermost ends of rods 32 relative to the stops 78 releasing the rods 32 to permit inward movement thereof for presetting the counters number wheels.

The indicia wheel 58 and driven gear 60 of each number wheel may be separately formed and keyed together, or may be integrally formed, as illustrated in FIG. 3. Similarly, the transfer drive gear sector 60 and the trip conditioning cam 62 are integrally formed and rotatably supported on eccentric bearing members 82.

The members 82 are keyed for joined rotation and are drivably connected to a preset conditioning pinion gear 84 rotatably mounted on the counter wheel shaft 56 for rotation by a rack 86 secured to the preset control rod 28. As shown in FIG. 4, an eccentric cam surface 88 on one end of each bearing member 82 acts against a cam follower nose portion 90 of the arms 74 to control the engagement and withdrawal of the arms 74 with the transfer pinions 68. The detent arms 74 are provided with elongated pivot slots 92 through which extends a fixed pivot shaft 94 spaced rearwardly of and extending parallel to the counter wheel shaft 56. The elongated slots 92 permit sliding adjustable engagement between scalloped detenting surface 96 of the arms 74 and the reverse curved surface 98 of the pinions ratchet wheel portion 70 to assure proper detent engagement therebetween while obviating split figure positioning of the pinion. An arm drive bar 100 extends across the top of all of the detent arms 74 and is urged into constant engagement therewith by tension springs 102 connected with the base of the frame to maintain the arms in following contact with the cam surfaces 88 of the bearing members 82. The bar 100 permits the use of fewer springs 102 yet provides a greater effective spring force acting on individual detent arms 74 during the presetting operation. Additionally, the lower total biasing force applies a smaller force against the cam surfaces 88 and permits the use of a smaller return spring 104 on the preset control rod 28.

Thus, with the preset control rod 28 in its normal withdrawn position, as illustrated in FIG. 2, the eccentric bearing members 82 are in a counting condition holding the pivotally mounted detent arms 74 out of engagement with their respective transfer pinions 68. When the preset control rod 28 is actuated inwardly, the preset pinion gear 84 is rotated about 180° by the rack 86. This, in turn, rotates the eccentric bearing members 82 and the members supported thereon to a presetting condition. In that condition, the locking ring and transfer drive gear sectors 60 are disengaged from the transfer pinions 68 and the cam surfaces 88 have allowed the arms 74 to pivot downwardly into engagement with the ratchet wheel portions 70 of the respective transfer pinions. Thereafter, inward actuation of the individual preset rods 32 rotates the associated pinion 68 to step the individual number wheel in a direction opposite to that of the normal counting operation so that selective reciprocation of the presetting rods 32 is effective to set a predetermined count on the number wheels of the counter.

As mentioned, the combined locking ring and drive gear sector 60 and the mutilated transfer pinion 68 are of modified design. In a conventional fashion, the transfer pinions 68 are provided with a driven gear portion 110 operatively associated with the sector 60 and a driving gear portion 112 axially spaced and separated from the portion 110 by an intermediate pinion-dividing ring 114 and the preset ratchet wheel portion 70. The driving gear portion 112 of each pinion is provided with conventional spur gear teeth 108 which intermesh with the driven gears 64 of the higher order number wheels for indexing the higher order wheels as an adjacent lower order number wheel completes a full revolution. The separated driven gear portion 110, on the other hand, conventionally is comprised of full and mutilated gear teeth. The mutilated gear teeth, such as teeth 106, extend axially from the ring 114 leaving a terminal surface portion 116 of the pinions hub 118 exposed. As can be seen in FIGS. 4 and 5, the arcuate peripheral surface 120 of the locking ring will be positioned within the space above the surface portion 116 provided by the mutilated pinion tooth 106 and will remain so positioned during nine-tenths of the lower order number wheels rotation. The immediately adjacent pinion teeth 122 on each side of that space provide a locking action which prevents rotation of the pinion during such rotation.

In accordance with the present invention, the two-tooth gear 124 of sector 60 has been modified by providing an end wall member 126 that blocks the conventionally open end of the recess or gullet 128 intermediate the two driving teeth of gear 124. Additionally, the pinion teeth 122 are inwardly mutilated to provide a notch 130 adjacent the pinion dividing ring 114. The notch 130 is complementary to the end wall member 126 that encloses gullet 128 thereby permitting the teeth 122 to enter the gullet. As the leading tooth of the two-tooth gear 124 comes into contact with an outwardly mutilated pinion tooth 106, it will act against that tooth to initiate count transfer rotation of the pinion. At the same time, the recess or gullet 128 will come into registry with an inwardly notched tooth 122. Continued rotation of drive sector 60 will cause the tooth 122 to rotate into the gullet 128 and be driven by the two-tooth gear 124 so as to produce the desired count transfer between the number wheels. As will be appreciated, the outwardly mutilated teeth 106 are in circumferential alignment with the notches 130 of the inwardly mutilated teeth 122 and are prevented by the end wall member 126 from entering the gullet to cause inadvertent misaligned engagement with the gear sector and split-figure positioning of the indicia wheels. Thus, proper count transfer driving engagement between adjacent number wheels is assured and wheel locking is prevented.

In accordance with the present invention, the preset conditioning or control rod 28 is operatively associated with an interlock lever 134 that prohibits actuation of the rod, and thus presetting of the counter, while the control ring 34 is in an angular position commensurate with a fully or partially open setting of the valve 10. Conversely, the interlock 134 allows presetting only when the valve is closed. The interlock lever 134 is pivotally mounted on the frame 22 through the cooperative engagement of an upright pivot pin 136 and an elongated pivot slot 138 in the lever. An end abutment 140 remote from the pivot slot 138 is positionable in and out of opposed confronting relationship with the inner end of the withdrawn preset control rod 28 to respectively prevent and allow inward actuation of the rod. The inner end of the rod is provided with a head portion 142 and a connecting constricted neck portion 144 while the lever 134 includes a rod latching shoulder 146 spaced intermediate the pivot slot 138 and the end abutment 140 for latchably engaging the head 142 and neck portion 144 of the control rod. A guide slot 148 on the lever 134 slidably engages a guide pin 150 secured to the frame for guiding the pivotal movement of the lever while a spring 152 biases the interlock lever in a clockwise direction, as viewed in FIG. 2, urging the shoulder 136 toward the confronting cam member 76. The lever 134 further includes an elongated aperture 154 that is centrally constricted to provide cam surfaces 156, 158, 160 operatively engageable by the upstanding flange 42 of the control ring 34 upon movement of the ring into and out of its "off" position shown in FIG. 6. Thus, upon movement of the ring 34 out of the "off" position, the flange 42 acts initially against the cam surface 156 to move the lever 134 counterclockwise against the bias of the spring 152 sufficiently to permit the rod latching shoulder 146 to release the head portion 142 of the rod. The return spring 104 for the preset control rod 28 thereupon drives the rod toward its withdrawn position simultaneously effecting rotation of the bearing members 82 and re-engagement between the pinions 68 and the wheel sectors 60. As the flange 42 passes into the constriction, it bears against cam surface 158 to shift the pivot slot 138 relative to pin 136 if the head portion 142 has not fully withdrawn. Thereafter, the lever 134 will move clockwise under the bias of the spring 152 thereby positioning the end abutment 140 in confronting relationship with the head portion 142 of the rod 28. Thus, the rod 28 is held by the interlock until the control ring 34 effects its release.

Reference is made now to the two-stage latching assembly which comprises first and second stage latching pawls 170, 172 that hold the loaded control ring 34 in a predetermined angular position and a trip mechanism including first and second stage counter controlled trip rakes 174, 176 and associated trip latches 178, 180 for latching the pawls 170, 172 and holding the control ring in either of at least two predetermined loaded angular positions. Each stage operates independently and provides for automatic re-latching of the control ring after a first stage trip permits the ring to rotate from one of the predetermined loaded angular positions to the other.

The first stage latching pawl 170 is pivotally mounted on the frame 22 adjacent the interlock lever 134 and includes at one end a latching shoulder 184 for latchably engaging the upstanding flange 42 of the control ring 34 and a trailing arcuate cam surface 186 facilitating movement of the flange 42 into its latched position. The opposite end of pawl 170 is provided with an upstanding latch lug 188 engageably by the first stage trip latch 178. The pawl 170 is biased by a return spring 190 in a counterclockwise direction, as viewed in FIG. 2, for urging the pawl into the latching position shown in FIG. 2. A pivot slot 192 is provided in the pawl intermediate the shoulder 184 and the latch lug 188 for mounting the pawl on pin 194 so that as the control ring 34 is moved clockwise away from its "off" position against the bias of its drive spring 46 and into its first "on" position corresponding to a fully open valve condition, the flange 42 of control ring 34 will engage the cam surface 186 and drive the pawl 170 along the slot 192 until the flange 42 passes beyond and engages the latching shoulder 184. The ring's drive spring 46 will then draw the flange 42 into driving engagement with shoulder 184 to urge the pawl 170 in a clockwise direction. However, the latching engagement between the latch lug 188 and the trip latch 178 is effective to retain the control ring 34 in its first "on" position.

Figure 7:
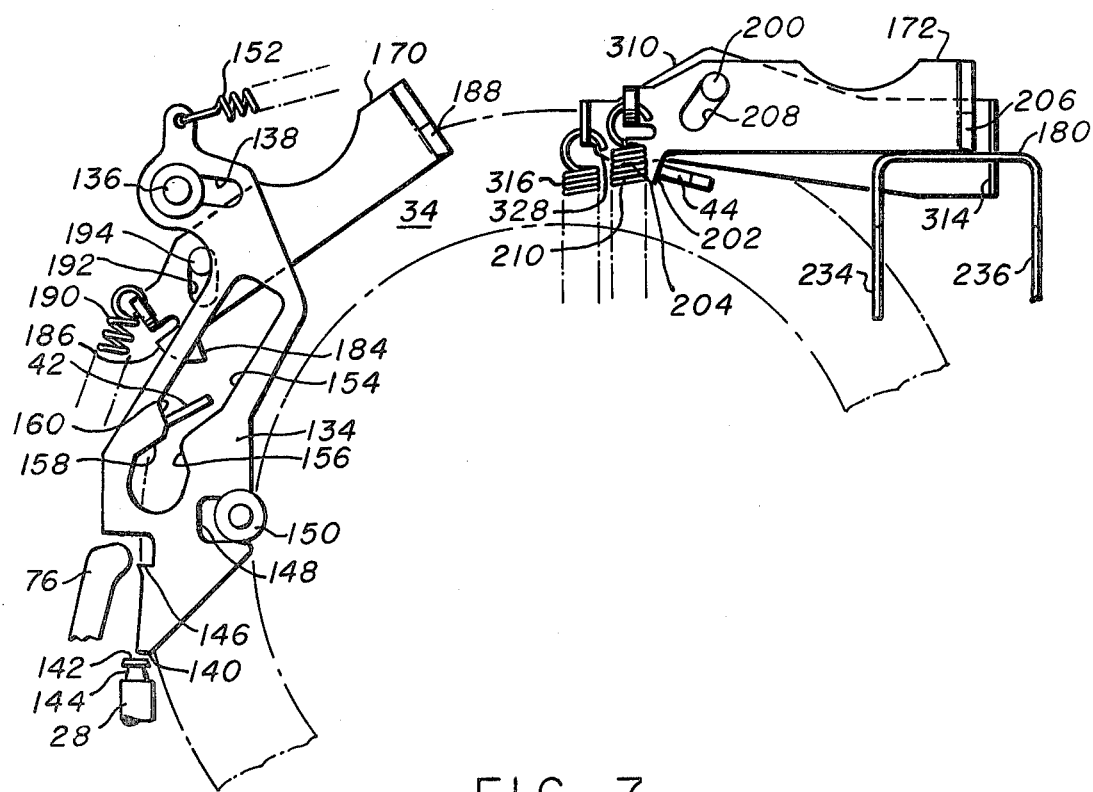
FIG. 7 is a view similar to FIG. 6 with the valve in its intermediate or partially open valve position.

As mentioned, the second stage latching pawl 172 arrests movement of the control ring 34 after a first stage tripping action has occurred. The second stage pawl 172 also is pivotally mounted on the frame 22 by the pivot pin 200 and is positioned adjacent the tab 44 carried by the control ring 34. Like the first stage pawl 170, the second stage pawl 172 includes a latching shoulder 202 and trailing cam surface 204 on one end. The opposite end of the pawl is provided with an upstanding latch lug 206 engageable by the trip latch 180 and an elongated pivot slot 208 is located intermediate the shoulder 202 and the lug 206. A return spring 210 urges the pawl 172 counterclockwise, as viewed in FIG. 2, into the latching position shown in FIG. 7. Since the circumferential distance on control ring 34 between the flange 42 and tab 44 is greater than the spacing between shoulders 184 and 202, the tab 44 is spaced from the shoulder 202 and passes well beyond the shoulder as the control ring 34 is moved into its first "on" position. However, as the ring is released by the first stage trip operation, it rotates counterclockwise under the driving action of the drive spring 46 which overpowers the pawl return spring 190. The tab 44 then moves into engagement with the shoulder 202 where it is latched by the blocking action of trip latch 180 against the latch lug 206. In this manner, the control ring 34 is held in its second "on" position, as shown in FIG. 7, corresponding to a partially open valve condition. Since the rotation of the ring into its second "on" position is insufficient to move the flange 42 through the constriction in the elongated aperture 154 or to drive against the cam surface 160, the end abutment 140 remains in confronting relationship to the rod 28, preventing the rod from being actuated while the valve is still partially open.

Figure 8:
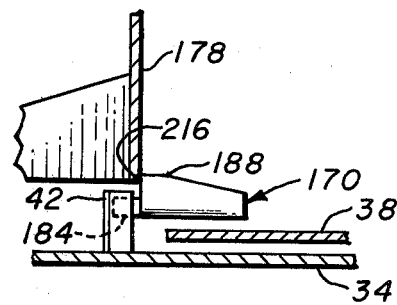
FIG. 8 is a sectional view taken along the lines 8—8 of FIG. 2 and illustrating the first stage latching mechanisms.

As mentioned, the trip latch mechanism includes a pair of trip latches 178 and 180 for releasably latching the respective first and second stage latch pawls 170 and 172. The first stage trip latch 178 comprises a vertically disposed, generally rectangular plate-like member pivotally mounted on the shaft 214 secured to the housing 22. As best shown in FIG. 8, the lower edge 216 of latch 178 provides a barrier to the clockwise pivotal movement of the upstanding latch lug 188 carried by the first stage latching pawl 170. The first stage trip latch 178 extends vertically and is pivotally connected adjacent its uppermost edge by a rod 220 to a flat first stage counter actuated rake 174 that extends towards the number wheel assembly of the presettable counter. The rake 174 terminates of in a plurality feeler fingers 224 and a trip hook 226, the fingers 224 being positioned in overlying following contact with the trip conditioning release cams 62 of the number wheels 50 and 52. The trip hook 226 is in registry with the drive wheel assembly 66 and is operative to engage the assembly for effecting a first stage tripping operation when permitted by the cams 62. A rake return spring 228 attached to the first stage rake 174 is effective to bias the feeler fingers 224 into constant engagement with the cams 62 and simultaneously bias the trip latch 178 in a clockwise direction as viewed in FIG. 8 to position the latch in a latching condition. The hook 226 will not be lowered into engagement with the drive wheel assembly 66 until the number wheels have reached a pre-established count for effecting the first stage tripping operation, at least one of the release cams 62 retaining the rake 174 in an elevated position until the pre-established count condition is reached. Thereafter, engagement of the hook 226 by the drive wheel assembly 66 will draw the first stage rake toward the front wall 24 of the presettable counter against the bias of the return spring 228 thereby causing counterclockwise rotation of the trip latch 178. The forward movement of the rake 174 is sufficient to lift the lower edge 216 of the latch above the upstanding latch lug 188 and release the lug from its latched position, permitting rotation of the pawl 170 in a clockwise direction under the driving force of the control ring 34.

Figure 9:
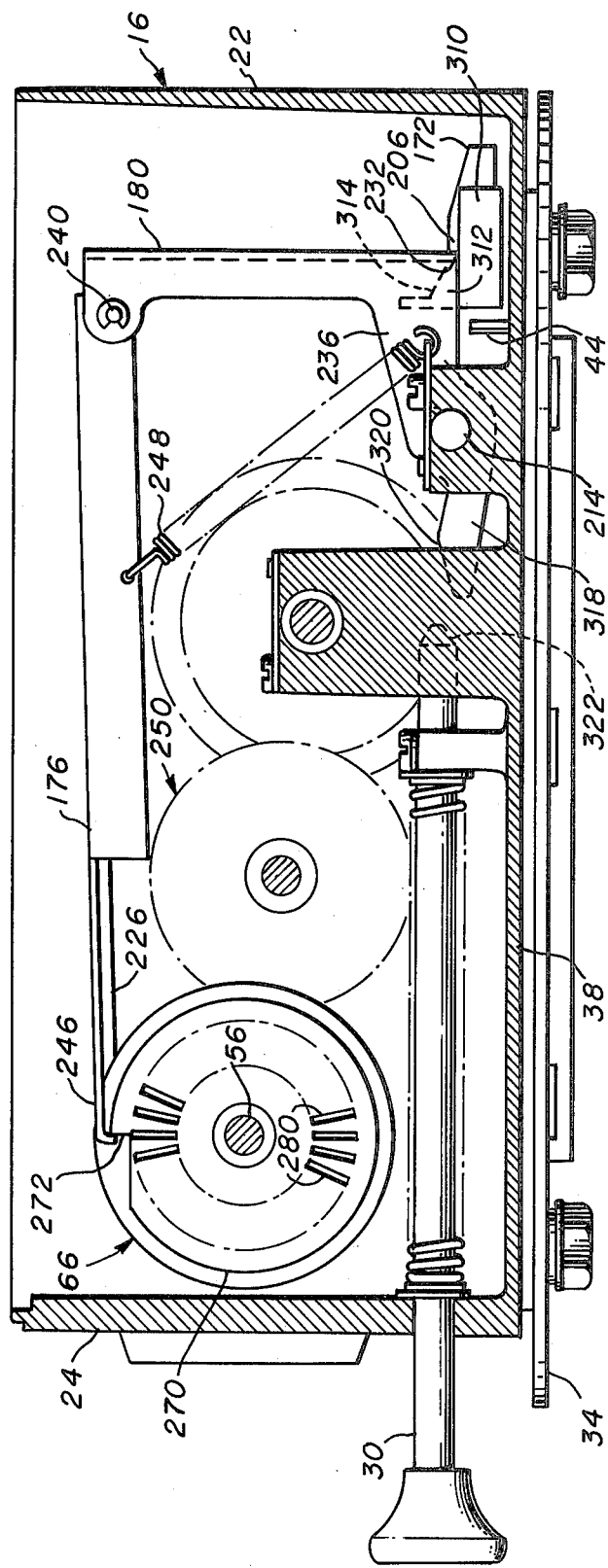
FIG. 9 is a side elevational view of the counter partially broken away and partially in section, illustrating a portion of the emergency stop mechanism of the presettable counter.

The second stage trip latch 180 of the trip latch mechanism is similar to the first stage latch 178 in that it includes a plate-like latching member having a lower edge 232 which forms a restraining barrier to the clockwise movement of the second stage latch pawl 172. The trip latch 180 is of generally U-shaped configuration and includes a pair of integral side legs 234 and 236 for pivotally mounting the trip latch on the shaft 214. However, the second stage trip latch 180 additionally includes a laterally extending arm 238 that rests against the back surface of latch member 178 so that pivotal movement of the second stage trip latch in a counter-clockwise direction as viewed in FIG. 9 will assure that both latches are in an actuated or tripped condition. The second stage trip latch 180 is pivotally connected by a rod 240 with an independent second stage rake 176 that overlies a portion of the first stage rake 174, as shown in FIGS. 2 and 9, and terminates in a feeler finger 244 engaging the outer peripheral surface of the next to lowest order number wheel 52 and a trip hook 246 operatively associated with the drive wheel assembly 66. A return spring 248 connected to the second stage rake 176 biases the finger 244 into following engagement with the number wheel 52 and urges the second stage trip latch 180 in a clockwise direction as viewed in FIG. 9 into the latching position illustrated. When the finger 244 permits the hook 246 to engage the drive wheel assembly 66, a second stage tripping operation is effected as a second pre-established count, typically zero, is reached on the number wheel assembly.

As mentioned, the drive shaft 18 and gear assembly 20 provide a rotary drive input to the presettable counter 16 from the meter 12. That input is conveyed through a gear train, indicated generally by the numeral 250 for driving the drive wheel assembly 66 which, in turn, drives the number wheels of the presettable counter. The drive wheel assembly 66 is coaxially mounted on the number wheel shaft 56 and, as best shown in FIG. 3, includes a drive gear 252 having an elongated first hub portion 254 extending axially from one side thereof toward the lowest order number wheel 54 for drivably engaging that wheel. The side face of gear 252 facing the lowest order number wheel is provided with a plurality of symmetrically spaced detent slots 256 while the elongated first hub portion 254 mounts an adjustable first stage trip cam 258. A detent pin 260 complementary to the side slots 256 projects from the side of the cam 258 and cooperates with the slots 256 in driving the trip cam during the counting operation. The trip cam 258 is biased into driven engagement with the drive gear 252 by means of a coil spring 262 mounted on the hub portion 254 of the gear. As will be appreciated, the cam 258 carries a peripheral trip shoulder 264, the location of which can be adjusted by simply axially displacing the cam 258 against the bias of the coil spring 262 to disengage pin 260 from the gear 252. The trip cam 258 may then be rotated until the shoulder 264 is properly located whereupon the detent pin 260 will cooperate with another side slot 256 to retain the cam in its newly adjusted position.

The drive gear 252 is also provided with a second hub portion 268 axially extending from the opposite side of the drive gear 252 from the first hub portion 254. The hub portion 268 mounts a second stage trip cam 270 that also is provided with a trip actuating shoulder 272 for effecting a second stage tripping operation. In accordance with the present invention, a ratchet adjustment mechanism also is provided intermediate the drive gear 252 and the second stage trip cam 270. In the specific embodiment illustrated, the ratchet adjustment mechanism takes the form of symmetrical, intermeshing ratchet teeth 274, 276 on the confronting surfaces of the respective members. The symmetrical ratchet teeth provide a driving connection between the drive gear 252 and the cam 270 yet simultaneously permit relative angular displacement in both rotary directions. As shown, the second stage trip cam 270 is maintained in close abutting relationship with the drive gear by means of a retaining ring 278 mounted on the second hub portion 268 while the exposed side face of the cam 270 is provided with a plurality of radially extending symmetrical notches 280 well suited to receiving the tip of a screwdriver or the like for angularly displacing the trip cam 270 relative to the drive gear 252.

Figure 10:
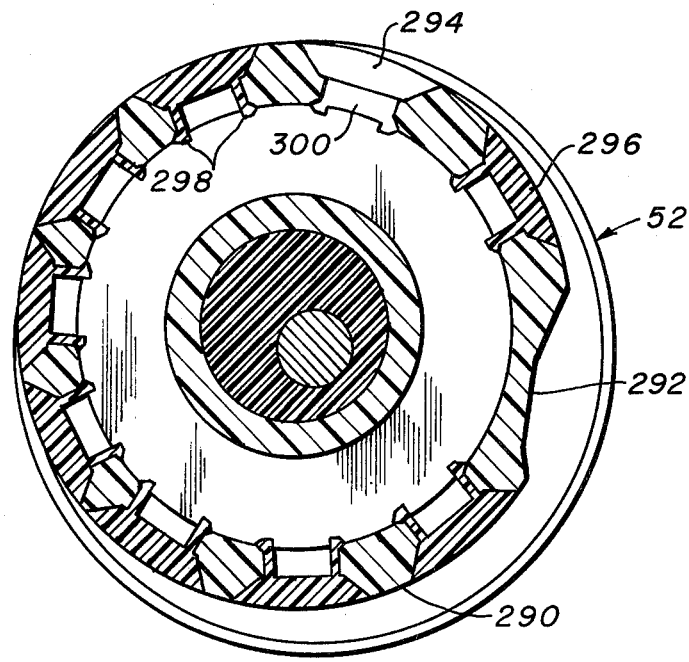
FIG. 10 is a sectional view taken along the lines 10—10 of FIG. 2 depicting a first stage trip cam associated with the tens wheel of the presettable counter.

Each of the trip conditioning cams 62 of the counter wheel assembly are provided with a recessed surface portion 282 that permits the feeler finger 224 of the rake 174 to drop, thus conditioning the rake for a tripping action by the hook 226. In accordance with the present invention, and as best shown in FIG. 10, the next to lowest order or tens number wheel 52 is provided with a trip conditioning cam 290 of modified design that permits adjustment of the first stage tripping operation to any designated tens count. As shown, the cam 290 is an eccentrically mounted unit having a recessed surface portion 292, substantially identical to surface portions 282, positioned at a location corresponding to the 0 count of the wheel. The cam 290 is further provided with a plurality of spaced peripheral recessed surface portions 294 corresponding to each of the remaining counts of the wheel. These recessed portions 294 are spaced to accommodate the eccentric mounting of the cam and are filled or plugged by removable inserts 296 which, when in place, provide a smooth arcuate contour to the exterior peripheral surface of the cam. As shown, the inserts 296 are provided with retaining hooks 298 that extend through appropriate openings 300 in the cam for holding the inserts in place during the counting operation. However, upon removal of one of the inserts, the cam 290 automatically exposes a second recessed surface 294 which will be engaged by an overlying feeler finger 224 of the first stage rake 174. Since the count is subtractive in nature, after the higher order number wheels 50 reach a 0 position, the newly exposed recessed cam portion 294 will rotate into position for engagement by the first stage rake fingers at the designated or desired predetermined digit on the tens wheel. Since the cam recess 294, exposed by removal of an insert 296, is of a slightly smaller circumferential extent than the cam recess surface 292 for the 0 position, the first stage trip is preferably effected during count transfer and the exposed recess is positioned nine unit counts prior to the tripping operation. The movement of the rake feeler fingers 224 into the recess permits the hook 226 on the rake to be conditioned to engage the shoulder 264 of the first stage trip cam 258 as that cam is drivably rotated by the drive gear 252. Thereupon, the shoulder 264 will draw the rake toward the front wall of the housing effecting a first tripping action before releasing the rake hook.

As will be appreciated, tripping during count transfer assures that the fingers 224 on the first stage rake do not tend to lift the rake prior to completion of the first stage tripping operation. During the count transfer, the tens wheel 52 will be rotating with the trip cam 258 thereby permitting the rake fingers to remain in the recess 294 for the full sliding action of the rake. Upon completion of the first stage trip and as a result of the count transfer associated therewith, the cam 290 lifts the follower fingers 224 of the first stage rake permitting its return by the spring 228 until the count reaches the desired position for the second stage tripping operation. During the first stage tripping operation, the rake 174 is drawn toward the front face of the counter housing causing counterclockwise pivotal movement of the trip latch 178, as viewed in FIG. 8, and release of the first stage latch pawl 170. The release permits the pawl 170 to move in a clockwise direction as viewed in FIG. 2 under the driving action of the control ring 34. Thus, the removable inserts 294 on the tens wheel 52 provide a cam surface which performs a dual function. First, it permits the first stage rake to drop into a condition for tripping at any count on the tens wheel without changing the entire cam member. Secondly, at count transfer, the cam following fingers engage the peripheral cam surface to lift the rake 174 upwardly against the bias of the spring 228 thereby assuring that the hook 226 will not re-engage the shoulder of the first stage trip cam. This permits the cam to continue to rotate with the drive gear toward the predetermined count for the second stage tripping operation. As will be appreciated, when all nine of the removable inserts 296 are positioned within their appropriate locations so that the only recessed cam surface seen by the fingers 224 of the first stage rake is the recess 292 located at the 0 count position, the first stage tripping operation will occur within a ten count or simultaneously with the second stage trip. However, for practical reasons, it is generally preferred that the first stage tripping operation takes place in advance of the second stage tripping operation by a count substantially greater than 10 in order to provide the advantages associated with partial closing of the valve during the first stage trip. This includes slower and more controlled delivery of fuel well prior to the second stage or full-off trip count and an accurate stop at the zero count.

The presettable counter also includes an emergency stop mechanism for effecting an emergency termination of a fuel delivery operation by the simple actuation of the emergency stop rod 30. The emergency stop mechanism includes an emergency release lever 310 pivotally mounted on the second stage pawl pivot pin 200. The lever 310 is positioned beneath the second stage latching pawl 172 on the base 38 of the presettable counter housing. The emergency release lever 310 extends beyond both ends of the second stage pawl 172 and on the end projecting beyond the lug 206 is provided with an upstanding ramp 312 having an inclined latch engaging top surface 314. The lever 310 is biased in a counterclockwise direction, as viewed in FIG. 2, by the drive spring 316 so as to bring the surface 314 of the ramp into engagement with the lower edge 232 of the second stage latch 180. As best seen in FIG. 9, the side leg 234 of the second stage trip latch 180 is provided with an elongated finger portion 318 extending toward the emergency stop rod 30, the finger portion 318 being provided with a camming top surface 320. Upon actuation, the innermost end 322 of the emergency stop rod 30 engages the cam surface 320 and pivots the latch 180 in a counterclockwise direction, as viewed in FIG. 9, against the bias of the return spring 248. As mentioned, the second stage trip latch member includes a laterally extending arm 238 that rests against the back surface of the first stage trip latch member 178 to assure actuation of both latches of the trip latch mechanism upon actuation of either the second stage tripping operation or the emergency stop operation. Thus, when the control ring 34 is located in its full "on" position, as illustrated in FIG. 2, actuation of the emergency stop rod 30 will effect simultaneous pivotal movement of both the first and second stage trip latches 178, 180 to release the first stage latching pawl 170 and permit counterclockwise rotation of the control ring 34 toward the "off" position. However, since the energency stop rod 30 may be released by the operator prior to full movement of the control ring 34 into the "off" position, the second stage latch 180 must be held in a tripped position to prevent its return to a latching barrier position under the influence of its return spring prior to engagement of the pawl 172 by the lug 44. The ramp 312 of the emergency release lever 310 prevents such return by its counterclockwise movement under the bias of the drive spring 316. Thus, the uppermost surface 314 of the ramp 312 holds the second stage latch 180 in its tripped position. Since the ramp surface 314 extends well above the upstanding latch lug 206, actuation of the emergency release lever will prevent retention of the control ring 34 in its intermediate position by the second stage latching pawl 172 and will permit the control ring 34 to move counterclockwise, as viewed in FIG. 2, to its full "off" position. A camming surface 328 is also provided on the opposite end of the emergency release lever 310 from the ramp 312 so that as the control ring 34 moves counterclockwise, as viewed in FIG. 2, toward its "off" position, camming surface 328 is engaged by tab 44 to rotate lever 310 clockwise, as viewed in FIG. 2, against the bias of its drive spring 316 to return the lever to a position which permits latching engagement of the second stage pawl.

As will be apparent to persons skilled in the art, various modifications, adaptations and variations of the foregoing specific disclosure can be made without departing from the teachings of the present invention.

I claim:

1. In a counter operated control mechanism comprising a rotatable control member, means urging said control member in a first angular direction, release means movable between a first position releasably latching said control member against movement in said first angular direction and a second position permitting its rotation in said direction, a counter controlling movement of said release means, and shiftable trip means for permitting movement of said release means to said second position in response to a reference count on said counter, the combination wherein said release means includes first and second release latches respectively movable between first operative and second withdrawn positions, said first release latch being operative in its said first operative position to latch said rotatable control member at a first angular position thereof and in its said second withdrawn position to permit rotation of said control member in said first angular direction, said second release latch being operative in its said first operative position to latch said rotatable control member at a second position angularly spaced in said first angular direction from said first angular position and in its said second withdrawn position to permit rotation of said control member in said first angular direction; said counter including first and second cam assemblies having trip controlling cam surfaces, said shiftable trip means including separate first and second shiftable trip members having cam followers for engaging said cam surfaces, said first trip member cam follower operatively engaging said first cam surface while said first release latch is in its first operative position and being shiftable in response to said first cam surface to permit movement of said first release latch to its said withdrawn position upon said counter reaching a first reference count and said separate second trip member cam follower operatively engaging said second cam surface upon movement of said first release latch out of its first operative position and being shiftable in response to said second cam surface to permit movement of said second release latch to its said withdrawn position upon said counter reaching a second referenced count.

2. The counter operated control mechanism of claim 1 wherein said second trip member includes a drive element operable to engage and shift said first trip member when said second trip member is shifted to permit movement of said second release latch to its withdrawn position.

3. The counter operated control mechanism of claim 1 wherein said first and second trip cam assemblies are mounted for movement into trip engagement with the respective first and second trip members, said first and second cam assemblies being operative to shiftably actuate said first and second trip members in response to the counter reaching said first and second referenced counts respectively.

4. The counter operated control mechanism of claim 3 wherein said trip cam assemblies include means defining first and second catch surfaces, said first and second trip members having hooks operative for movement into engagement with said respective first and second catch surfaces for independent tripping of said release latches, said first and second catch surfaces being positioned for engaging said hooks at said first and second referenced counts respectively.

5. The counter operated control mechanism of claim 4 wherein said counter includes a drive wheel, said first and second trip cam assemblies including axially spaced cam members connected to said drive wheel for rotation therewith, said first and second catch surfaces being rotatably adjustable relative to each other for adjusting the relative reference count at which tripping occurs.

6. The counter operated control mechanism of claim 1 wherein the counter is a presettable counter and said second referenced count is lower than said first referenced count, said first and second trip members each being movable between a first latch retaining position and a second trip position, said trip members being biased toward said first latch retaining positions.

7. The counter controlled mechanism of claim 1 including selectively actuable emergency release means operable for shifting said first and second trip members for emergency release of said control member.

8. The counter operated control mechanism of claim 7 wherein said selectively actuable emergency release means including a manually operated button operable for simultaneously shifting said first and second trip members, said emergency means maintaining said trip members in their shifted positions thereby permitting movement of said first and second release latches to their withdrawn positions to permit rotation of said control member in said first angular direction beyond its second position.

9. The counter operated control mechanism of claim 8 wherein said emergency release means includes an emergency pawl movable between a retained position and a release position and means biasing said emergency pawl toward said release position.

10. The counter operated control mechanism of claim 9 wherein the control member operatively engages the emergency pawl to drive the pawl toward its retained position against the bias of said biasing means upon movement of the control member in said first angular direction from said second position.

11. The counter operated control mechanism of claim 1 wherein said first and second cam surface includes peripheral recesses for following engagement by respective first and second trip member followers and first and second catch surfaces for shiftably driving said trip members, said first and second trip member followers comprising respective first and second trip combs having cam follower fingers for engaging said cam surfaces and trip hooks for engagement with said respective first and second catch surfaces upon positioning of the comb fingers in the respective peripheral cam recess, said first comb underlying said second comb and preventing positioning of a second comb finger within a respective cam recess while a first comb finger is not positioned within its respective cam recess.

12. The counter operated control mechanism of claim 1 wherein said first and second trip members including respective first and second retaining plates and trip combs in driving engagement with said plates, said plates being mounted for pivotal movement between latch retaining positions and trip positions, said combs having separate count actuating means, biasing means urging said plates into their respective latch retaining positions, the actuating means of said first comb being operative to shift said first comb at said first referenced count for drivably pivoting said first plate against the bias of its respective biasing means toward the trip position to release said first release latch and permit movement thereof to its withdrawn position, the actuating means of said second comb being operative to shift said second comb at said second referenced count for drivably pivoting said second plate against the bias of its biasing means toward the trip position to release said second release latch and permit movement thereof toward its withdrawn position.

13. The counter operated control mechanism of claim 1 wherein said counter includes a plurality of rotary number wheels and a drive assembly in rotary driving relationship with said number wheels, axially spaced first and second catch surfaces associated with said drive assembly, first and second cams associated with said number wheels for engagement by said trip members, said first trip member including a trip hook in registry with said first catch surface for engagement therewith, said first catch surface drivably engaging the hook of said first trip member at said first referenced count to shift said first trip member and release said first release latch to permit movement thereof to its withdrawn position as said rotatable control member rotates in said first angular direction to said second angularly spaced position, said second comb overlying said first comb, said second trip member including a trip hook in registry with said second catch surface for engagement therewith, said second catch surface drivably engaging the hook of said second trip member at said second referenced count to shift said second trip member and release said second release latch to permit movement thereof toward its withdrawn position as said rotatable control member rotates in said first angular direction of said second position.

14. The counter operated control mechanism of claim 1 wherein said counter includes a lower order number wheel assembly and a plurality of higher order number wheels, axially spaced first and second catch surfaces associated with said lower order number wheel assembly, a first cam surface including a peripheral recess associated with at least one of said higher order number wheels for following engagement by said first trip member, a second cam surface axially spaced from said first cam surface, said second cam surface including a peripheral recess associated with at least one of said higher order wheels for following engagement by said second trip member, said first and second trip members including cam followers engaging said cam surfaces and trip hooks operative for engagement with said catch surfaces upon positioning said cam followers in the respective peripheral cam recess of said first comb at said first referenced count to shift said first comb and pivot said first plate against the bias of the respective biasing means toward the trip position to release said first release latch and permit movement thereof to its withdrawn position as said rotatable control member rotates in said first angular direction to said second angularly spaced position, said second comb overlying said first comb, said second catch surface engaging the hook of said second comb at said second referenced count to shift said second comb and pivot said secnd plate against the bias of its biasing means toward the trip position to release said second release latch and permit movement thereof toward its withdrawn position as said rotatable control member rotates in said first angular direction out of said second position.

15. The counter operated control mechanism of claim 1 wherein said counter includes a plurality of number wheels including lower and higher order wheels and a drive assembly in rotary driving relationship with said number wheels, axially spaced first and second catch surfaces associated with said drive assembly, a first cam surface including a peripheral recess associated with at least one of said higher order wheels for following engagement by said first trip member, a second cam surface including a peripheral recess axially spaced from said first cam surface and associated with at least one of said higher order wheels for following engagement by said second trip member, said first and second trip members including respective first and second latch retaining plates and trip combs in driving engagement with said plates, said plates being mounted for pivotal movement between latch retaining positions and trip positions, said combs having respective cam follower fingers engaging said cam surfaces and trip hooks in registry with said respective first and second catch surfaces for engagement therewith upon positioning of the comb fingers in the respective peripheral cam recess, biasing means urging said plates into their respective latch retaining positions, said first catch surface drivably engaging the hook of said first comb at said first referenced count to shift said first comb and pivot said first plate against the bias of the respective biasing means toward the trip position to release said first release latch and permit movement thereof to its withdrawn position as said rotatable control member rotates in said first angular direction to said second angularly spaced position, said second comb overlying said first comb, said second catch surface engaging the hook of said second comb at said second referenced count to shift said second comb and pivot said second plate against the bias of its biasing means toward the trip position to release said second release latch and permit movement thereof toward its withdrawn position as said rotatable control member rotates in said first angular direction out of said second position.

16. The mechanism of claim 1 wherein the counter has a plurality of counter wheels of ascending order, the higher order wheels of said counter have said peripheral first cam surface engageable by said first trip member and a primary peripheral recess in said cam surface, one of said higher order counter wheels being provided with a plurality of angularly spaced secondary peripheral recesses and a plurality of removable inserts mounted in said secondary recesses for selective removal to expose the recess to said cam follower, said inserts when mounted within the respective recesses having an exposed surface conforming to said cam surface.

17. The counter operated control mechanism of claim 16 wherein said one higher order counter wheel is the next to lowest order wheel, said peripheral recesses corresponding in number to the counts of the counter wheel, said secondary recesses being substantially identical and spaced along said cam surface, said recesses having radially extending apertures, said inserts including a body portion with insert surfaces having a smooth arcuate contour covering the peripheral extent of the secondary recess and mounting means extending into said recess apertures, said mounting means releasably retaining said inserts within said recesses.

18. The counter operated control mechanism of claim 16 wherein said counter includes first and second cam surface including peripheral recesses for following engagement by the respective first and second trip members and first and second catch surfaces for shiftably driving said trip members, said first and second trip members including respective first and second trip combs having cam follower fingers for engaging said cam surfaces and trip hooks for engagement with said respective first and second catch surfaces upon positioning of the comb fingers in the respective peripheral cam recess, said first comb underlying said second comb and preventing positioning of a second comb finger within a respective cam recess while a first comb finger is not positioned within its respective cam recess.

* * * * *